United States Patent
Wille et al.

(10) Patent No.: US 7,666,044 B2
(45) Date of Patent: Feb. 23, 2010

(54) METHOD OF SUPPLYING OIL FROM A FLOATING PRODUCTION STRUCTURE TO AN OFFLOADING BUOY VIA A THERMALLY INSULATED FLEXIBLE TRANSFER DUCT

(75) Inventors: Hein Wille, Eze (FR); Erik Jan Rooduijn, Monaco (MC)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 10/579,753

(22) PCT Filed: Nov. 16, 2004

(86) PCT No.: PCT/EP2004/013051

§ 371 (c)(1),
(2), (4) Date: May 18, 2006

(87) PCT Pub. No.: WO2005/050083

PCT Pub. Date: Jun. 2, 2005

(65) Prior Publication Data

US 2007/0051518 A1    Mar. 8, 2007

(30) Foreign Application Priority Data

Nov. 19, 2003   (EP) .................................. 03078631

(51) Int. Cl.
*B63B 22/02*    (2006.01)

(52) U.S. Cl. .......................................................... 441/4

(58) Field of Classification Search ...................... 441/4
See application file for complete search history.

(56) References Cited

U.S. PATENT DOCUMENTS

| | | | | | |
|---|---|---|---|---|---|
| 3,972,223 | A | * | 8/1976 | Torghele | ................ 73/862.581 |
| 3,984,059 | A | * | 10/1976 | Davies | ........................ 141/387 |
| 4,315,408 | A | * | 2/1982 | Karl | ........................... 62/50.7 |
| 4,339,002 | A | * | 7/1982 | Gibbs | ......................... 166/355 |
| 4,590,971 | A | | 5/1986 | Webster et al. | |
| 6,394,154 | B1 | * | 5/2002 | Pollack | ....................... 141/387 |
| 6,397,895 | B1 | | 6/2002 | Lively | |
| 6,932,121 | B1 | * | 8/2005 | Shivers, III | ..................... 141/1 |
| 6,976,443 | B2 | * | 12/2005 | Oma et al. | .............. 114/144 B |

FOREIGN PATENT DOCUMENTS

| | | |
|---|---|---|
| WO | WO 02/16726 A1 | 2/2002 |
| WO | WO 02/44607 A1 | 6/2002 |

\* cited by examiner

*Primary Examiner*—Stephen Avila
(74) *Attorney, Agent, or Firm*—Young & Thompson

(57) ABSTRACT

Method of supplying oil from a first floating structure to an offloading structure, includes providing a flexible duct extending between the two structures at a water depth of between 50 m and 500 m, the duct including a flexible elastomeric material and having an internal diameter of at least 600 mm and a length of between 1500 and 3000 m,
providing at least one pump at the first structure and pumping the oil through the duct at a pressure between 5 bar and at a flow rate between 1000 and 50,000 m³/hr,
providing a single flexible duct, and
providing a wall thickness of the duct such that at water temperatures between 2° C. and 20° C., the oil has at the first structure an inlet temperature $T_{in}$ and at the second structure an outlet temperature $T_0$ that $T_{in}$-$T_0$ is smaller that or equal to 15° C., preferably smaller than 5° C.

20 Claims, 3 Drawing Sheets

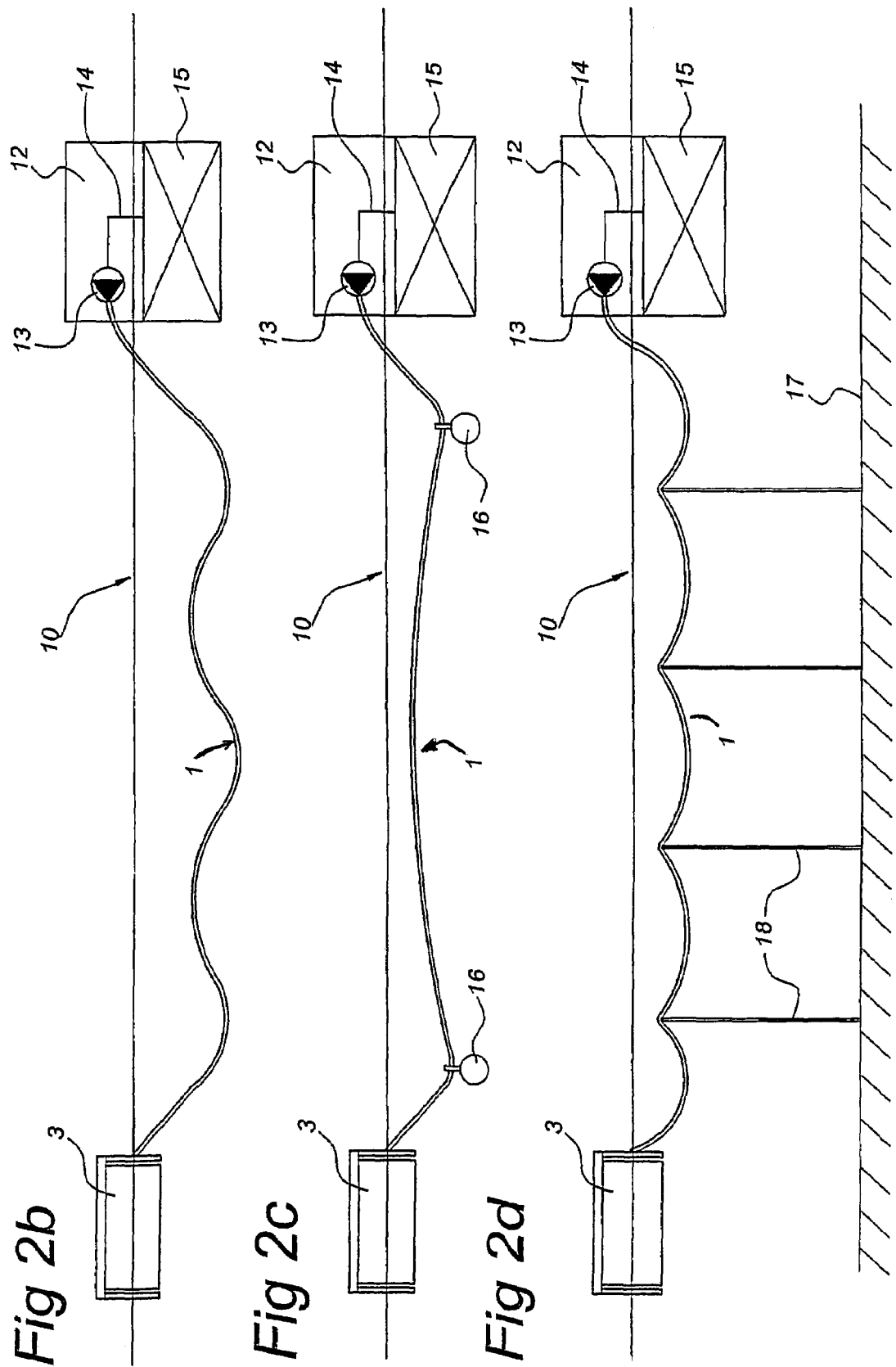

Figure 1:
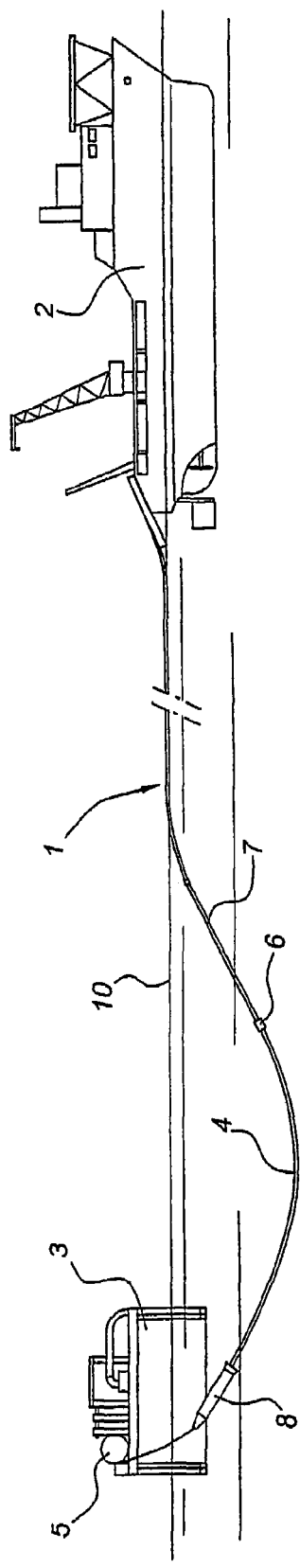

METHOD OF SUPPLYING OIL FROM A FLOATING PRODUCTION STRUCTURE TO AN OFFLOADING BUOY VIA A THERMALLY INSULATED FLEXIBLE TRANSFER DUCT

BACKGROUND OF THE INVENTION

1. Field of the Invention

The invention relates to a method of supplying oil from a first floating structure to an offloading structure, comprising the steps of:

providing a flexible duct extending between the two structures at a water depth of between 50 m and 500 m, the duct comprising a flexible elastomeric material and having an internal diameter of at least 600 mm and a length of between 1,500 and 3,000 m, and providing at least one pump at the first structure and pumping the oil through the duct at a pressure between 5 bar and 30 bar and at a flow rate between 1,000 and 50,000 m$^3$/hr.

2. Description of the Related Art

Such flexible ducts are known from WO 02/44607, in which a marine hose is described which may have a length of 2 km or more, extending between an oil rig, FPSO, TLP, SPAR or Semi submersible, and an offloading buoy, such as a catenary anchor leg mooring (CALM) buoy, at depths between 80 and 30 meters. The known hose consists of 12-meter elastomeric segments with an internal diameter of 600 mm having end coupling flanges. The known duct is applied as a bundle of parallel ducts for increased capacity.

Rigid steel pipes are also used for transfer of crude oil, and generally have a diameter of 24" such that multiple ducts are used in parallel for obtaining sufficient capacity. The transfer pipes extending horizontally below water level between the floating structure and the offloading buoy are supported by floaters. Due to the weight of the steel pipes and their limited flexibility, these steel pipes are subject to metal fatigue.

When hydrocarbons, such as oils are transported through the known mid-water transfer pipes, heat loss through these pipes results in increased viscosity of the hydrocarbons and reduced flow capacity.

BRIEF SUMMARY OF THE INVENTION

It hence is an object of the present invention to provide a method of transfer of hydrocarbons through a duct between two floating structures which can operate at reduced pumping pressures and allows efficient transfer of crude oil in relatively large volumes. It is another object of the present invention to provide a method of transfer of hydrocarbons via a light weight duct, which is less subject to fatigue problems and which can be easily installed.

Hereto the method according to the invention is characterised by providing a single flexible duct, and providing a wall thickness of the duct such that at water temperatures between 2° C. and 20° C., preferably between 2° C., and 10° C., the oil comprises at the first structure an inlet temperature $T_{in}$, and at the second structure an outlet temperature $T_0$ which is such that $T_{in}$-$T_0$ is smaller than or equal to 15° C., preferably smaller than 5° C.

By providing a single, large diameter duct, instead of a bundle of ducts, the surface area of the duct, and hence the resultant heat loss through the surface of the duct is reduced. By providing a sufficient wall thickness, for instance by providing a wall thickness of elastomeric material between 3 cm and 7 cm, or by providing an insulation layer around the duct such as a layer of polystyrene material of a thickness of between 2 cm and 10 cm, the heat loss through the duct is reduced and crude oil can be pumped at reduced and substantially constant viscosity, such as between 40 cP at 40° C. and 8 cP at 50° C., at low pumping pressures.

Preferably the heat transfer coefficient of the mid depth transfer duct is between 0.1 and 0.5 W/mK. In particular at water temperatures of between 4° C. and 10° C., the low eat transfer coefficient results in a reduced heat loss over the length of the transfer duct, and in a substantially constant, low viscosity of the crude oil over the whole length of the transfer duct.

In a preferred embodiment, the insulating material may comprise an insulating foam, having buoyancy, such that the transfer duct has for instance substantially neutral buoyancy.

A friction reducing liner may be included in the transfer duct, such a and Nitrile layer, to obtain reduced pumping pressures.

BRIEF DESCRIPTION OF THE DRAWING FIGURES

Figure 2A:
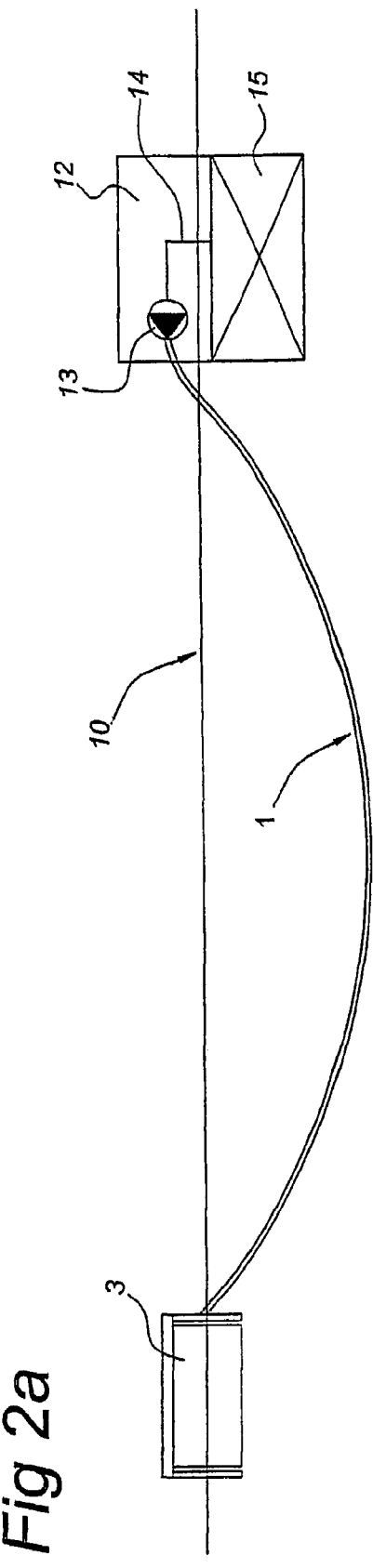
Figure 3:
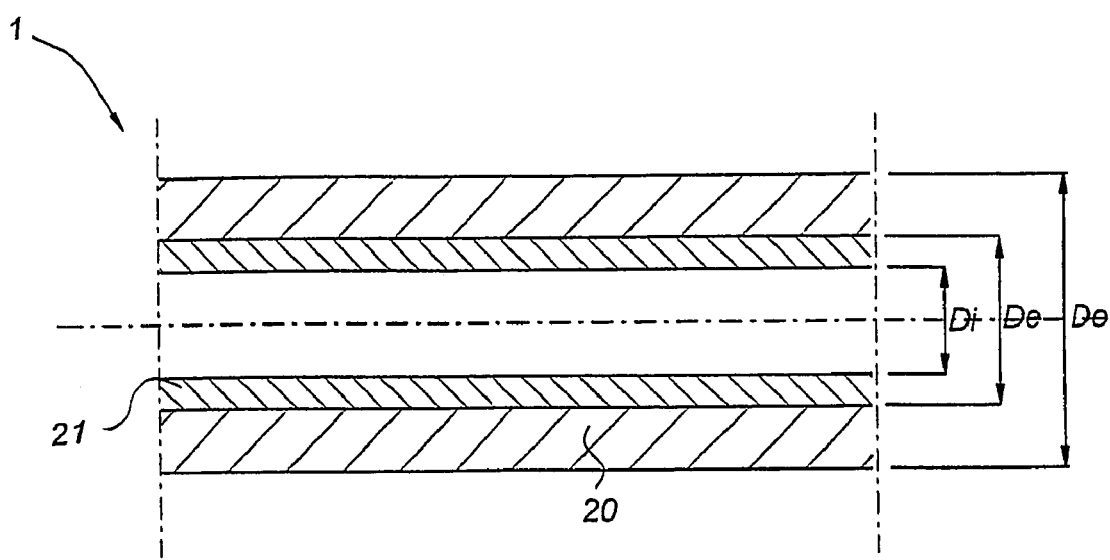

An embodiment of the method according to the present invention will be explained in detail with reference to the accompanying drawings. In the drawings:

FIG. 1 shows a schematic overview of a mid-water flexible transfer hose according to the present invention, FIG. 2a-2d show different configurations of the transfer hose of the present invention, and FIG. 3 shows a longitudinal cross section of a transfer hose of the present invention.

DETAILED DESCRIPTION OF THE PREFERRED EMBODIMENTS

FIG. 1 shows a flexible mid depth transfer hose 1, which is deployed from a dynamically positioned supply vessel 2. The transfer hose 1 is connected to a CALM offloading buoy 3 via a pull-in wire 4, connected to a winch 5 on the buoy. By winding up the pull in wire 4 on the winch, a connector head 6 on flooded hose section 7 can be pulled in and locked in connector 8 at the bottom of the buoy 3. The flexible hose 1 has a length of between 1500 m and 3000 m and extends at a depth of between 50 m and 500 m below water level 10. The end of the hose 1 at the side of the supply vessel 2 is connected to a floating structure 12, such as an FPSO, a TLD (Tension Leg Deck), SPAR or Semi-submersible such as shown if FIGS. 2a-2d. On the floating structure 12, the hose 1 is connected to a pump unit 13, which is connected with an inlet duct 14 to a tank 15 or other oil supply source.

FIG. 2a shows a simple catenary configuration of the flexible hose 1, FIG. 2b a wave configuration, FIG. 2c a hybrid configuration with tensioning weights 16 and FIG. 2d a tethered configuration, in which the hose 1 is connected to the sea bed 17 via tethers 18.

Hydrocarbons, such as crude oil, are supplied to the offloading buoy 3 at a rate of for instance 50,000 barrels per hour and a pumping pressure of pump 13 of 18 bar. In the duct, the oil temperature may be 40° C. and its viscosity will be about 40 cP. The water temperature at a depth of 200 m will be about 14° C. The temperature isolation of the flexible hose 1, which may be formed of rubber, such as described in WO 02/44607, which application is incorporated herein by reference, is such that the temperature difference between the outlet temperature $T_0$ of the crude oil at the buoy 3 and the inlet temperature $T_{in}$ of the oil at the floating structure 12 is not more than 15° C., preferably lower than 5° C. The inlet temperature $T_{in}$ may be between 30° C. and 70° C. The reduced heat loss results in a substantially constant viscosity over the length of the hose 1 and hence in improved hydrocarbon flow.

As is shown in FIGS. 2a-2d, a single flexible hose 1 extends from the first floating structure 12 to the offloading buoy 3. Multiple off loading buoys 3 may be used, at different distances from the floating structure, each time a single large-diameter flexible hose according to the present invention extends from the floating structure to a respective off loading buoy.

As is shown in FIG. 3, the hose 1 may comprise an outer layer 20 of insulating rubber or polystyrene, of a thickness of at least 2 cm. Preferably the layer 20 is a buoyant material. The hose 1 has a wall 21 for instance of steel-reinforced rubber of wall thickness of between 0.5 cm and 1.5 cm. The inner surface of the wall 21 may be provided with a liner of reduced friction characteristics, such as a liner of Nitrile material. The internal diameter Di of the hose 1 is between 500 mm and 800 mm, the external diameter De of the inner hose part is between 100 mm and 200 mm and the outer diameter D0 is between 600 mm and 1000 mm.

The invention claimed is:

1. A method of supplying oil from a first floating structure to an offloading structure, comprising the steps of:
    providing a single flexible duct extending between the two structures at a water depth of between 50 m and 500 m, the duct comprising a flexible elastomeric material and having an internal diameter of at least 600 mm and a length of between 1,500 m and 3,000 m;
    providing at least one pump at the first structure and pumping the oil through the duct at a pressure between 5 bar and 30 bar and at a flow rate between 1,000 and 50,000 $m^3$/hr, wherein
    providing a wall thickness of the duct such that at water temperatures between 2° C. and 20° C., the oil has at the first structure an inlet temperature $T_{in}$ and at the second structure an outlet temperature $T_0$ which is such that $T_{in}$-$T_0$ is smaller than or equal to 15° C.,
    end sections of the duct being situated above water level, the duct being situated in an upper half of a water depth, the duct arrangement being symmetrical with respect to a central vertical plane.

2. The method according to claim 1, further comprising providing a wall with a heat transfer coefficient smaller than 10 W/mK.

3. The method according to claim 1, further comprising a step of providing an insulating material around the duct having buoyancy.

4. The method according to claim 1, wherein the water temperature is between 2° C. and 10° C.

5. The method according to claim 1, wherein $T_{in}$-$T_0$ is smaller than 5° C.

6. The method according to claim 2, wherein the heat transfer coefficient is between 0.1 and 1 W/mK.

7. The method according to claim 3, wherein the insulating material is insulating rubber or polystyrene.

8. The method according to claim 3, wherein the insulating material has a thickness of between 2 cm and 10 cm.

9. The method according to claim 1, further comprising providing a friction reduction layer on an inner wall of the duct.

10. The method according to claim 9, wherein the friction reduction layer is formed from a nitrile material.

11. The method according to claim 1, wherein the offloading structure comprises a buoy without hose storing capacity.

12. The method according to claim 11, wherein the buoy is a CALM buoy.

13. The method according to claim 11, wherein a winch is on the buoy.

14. The method according to claim 11, wherein a connector is at a bottom of the buoy.

15. The method according to claim 14, wherein a connector head on a flooded duct section can be pulled in and locked in the connector.

16. A method of supplying oil from a floating structure to a buoy, comprising the steps of:
    providing a single flexible duct extending between the floating structure to the buoy at a water depth of between 50 m and 500 m, the duct comprising a flexible elastomeric material and having an internal diameter of at least 600 mm and a length of between 1,500 m and 3,000 m;
    providing at least one pump at the floating structure and pumping the oil through the duct at a pressure between 5 bar and 30 bar and at a flow rate between 1,000 and 50,000 $m^3$/hr, wherein
    providing a wall thickness of the duct such that at water temperatures between 2° C. and 20° C., the oil has at the floating structure an inlet temperature $T_{in}$ and at the buoy an outlet temperature $T_0$ which is such that $T_{in}$-$T_0$ is smaller than or equal to 15° C.,
    end sections of the duct being situated above water level, the duct being situated in an upper half of a water depth, the duct arrangement being symmetrical with respect to a central vertical plane.

17. The method according to claim 16, wherein the buoy is without hose storing capacity.

18. The method according to claim 16, wherein the buoy is a CALM buoy.

19. The method according to claim 16, wherein a winch is on the buoy.

20. The method according to claim 16, wherein a connector is at a bottom of the buoy.

* * * * *